United States Patent

Offer

[11] Patent Number: 5,688,419
[45] Date of Patent: Nov. 18, 1997

[54] METHOD FOR MITIGATING RESIDUAL STRESSES IN WELDED METAL COMPONENTS USING HIGH TORCH TRAVEL SPEEDS

[75] Inventor: Henry Peter Offer, Los Gatos, Calif.

[73] Assignee: General Electric Company, San Jose, Calif.

[21] Appl. No.: 259,805

[22] Filed: Jun. 15, 1994

Related U.S. Application Data

[63] Continuation-in-part of Ser. No. 231,614, Apr. 22, 1994, and Ser. No. 237,732, May 4, 1994, Pat. No. 5,527,441.

[51] Int. Cl.⁶ .................................................. B23K 9/00
[52] U.S. Cl. ............................... 219/137 R; 228/231
[58] Field of Search .................. 219/137 R, 61, 219/125.12; 148/524, 525, 526; 228/231

[56] References Cited

U.S. PATENT DOCUMENTS

| | | | |
|---|---|---|---|
| 4,095,085 | 6/1978 | Tomita et al. | 219/125.12 |
| 4,302,658 | 11/1981 | Beigay | 219/137 R |
| 4,588,869 | 5/1986 | Yoshida et al. | 219/76.14 |
| 5,022,936 | 6/1991 | Tsujimura et al. | 148/135 |

FOREIGN PATENT DOCUMENTS

| | | |
|---|---|---|
| 1343963 | 2/1964 | France. |
| 2448574 | 9/1980 | France. |
| 3406314 | 8/1984 | Germany. |
| 1109280 | 8/1984 | U.S.S.R. ................... 219/137 R |

OTHER PUBLICATIONS

Krause, "Stress Improvement of GTAW-P-ME Welds in Austenitic Stainless Steel Pipe", Welding Journal, vol. 65, No. 5, May 1986, pp. 21–29.

*Primary Examiner*—Clifford C. Shaw
*Attorney, Agent, or Firm*—James E. McGinness

[57] ABSTRACT

A process for providing a significant improvement in the detrimental tensile residual stress condition on the root side of welds, especially on the inside wall of piping welds. The method uses a high welding torch travel speed (>10 inches/min), especially on the last one or two cap passes. The process relies on the limited thermal heat sink capability of the pipe wall and nearly completed weld joint itself to generate a significant through-wall temperature gradient, and therefore a sufficient through-wall stress gradient during the welding. This stress gradient results in metal plasticity and permanent strains, and therefore a reduction in the magnitude of the final residual stress or, preferably as conditions allow, a reversal in the direction of the stresses from tensile to compressive. The method can be used as a welding process or as a heat treatment. In the case of heat treatment, the far surface of the weld joint is heated without fusion of the material making up the far surface.

28 Claims, 7 Drawing Sheets

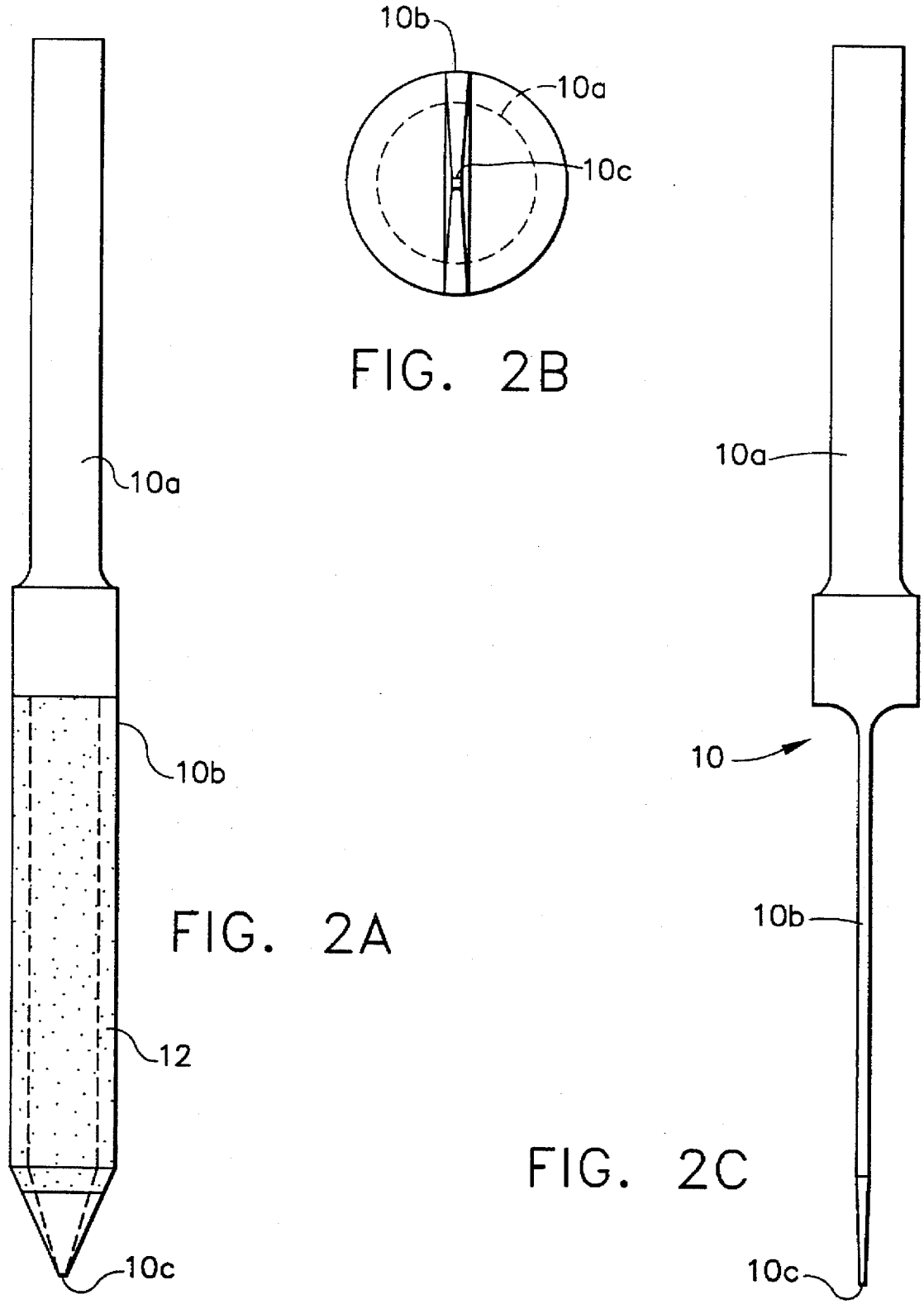

METHOD FOR MITIGATING RESIDUAL STRESSES IN WELDED METAL COMPONENTS USING HIGH TORCH TRAVEL SPEEDS

RELATED APPLICATIONS

This application is a continuation-in-part application of U.S. patent applications Ser. Nos. 08/231,614 filed on Apr. 22, 1994, pending, and 08/237,732 filed on May 4, 1994 now U.S. Pat. No. 5,527,441.

FIELD OF THE INVENTION

This invention relates to the welding of piping and other residual stress-sensitive components. In particular, the invention relates to the welding of piping and other components used in nuclear reactors, which components are susceptible to stress corrosion cracking in the heat affected zones adjacent to a weldment.

BACKGROUND OF THE INVENTION

A nuclear reactor comprises a core of fissionable fuel which generates heat during fission. The heat is removed from the fuel core by the reactor coolant, i.e. water, which is contained in a reactor pressure vessel. Respective piping circuits carry the heated water or steam to the steam generators or turbines and carry circulated water or feedwater back to the vessel. Operating pressures and temperatures for the reactor pressure vessel are about 7 MPa and 288° C. for a boiling water reactor (BWR), and about 15 MPa and 320° C. for a pressurized water reactor (PWR). The materials used in both BWRs and PWRs must withstand various loading, environmental and radiation conditions. As used herein, the term "high-temperature water" means water having a temperature of about 150° C. or greater, steam, or the condensate thereof.

Some of the materials exposed to high-temperature water include carbon steel, alloy steel, stainless steel, and nickel-based, cobalt-based and zirconium-based alloys. Despite careful selection and treatment of these materials for use in water reactors, corrosion occurs on the materials exposed to the high-temperature water. Such corrosion contributes to a variety of problems, e.g., stress corrosion cracking, crevice corrosion, erosion corrosion, sticking of pressure relief valves and buildup of the gamma radiation-emitting Co-60 isotope.

Stress corrosion cracking (SCC) is a known phenomenon occurring in reactor components, such as structural members, piping, fasteners, and welds, exposed to high-temperature water. As used herein, SCC refers to cracking propagated by static or dynamic tensile stressing in combination with corrosion at the crack tip. The reactor components are subject to a variety of stresses associated with, e.g., differences in thermal expansion, the operating pressure needed for the containment of the reactor cooling water, and other sources such as residual stress from welding, cold working and other asymmetric metal treatments. In addition, water chemistry, welding, heat treatment, and radiation can increase the susceptibility of metal in a component to SCC. The present invention is concerned with mitigating welding-induced residual stresses and thermal sensitization, which can lead to SCC in susceptible metals.

A conventional V-groove weld 6 for joining two pipes 2 and 4 is illustrated in FIG. 1A. The weld 6 is formed by filling the V-groove with beads of fused material from a filler wire placed at the tip of a circular cylindrical welding electrode (not shown). This welding process produces a very wide heat affected zone (HAZ) in the vicinity of the welded joint. The occurrence of SCC in the vicinity of such welded joints has led to the need for repair or replacement of much of the piping in light water reactor power plants throughout the world. Numerous methods have been utilized for over a decade to improve the tensile residual stress state in the vicinity of welded joints, including magnetic induction, electrical resistance and electric arc heating methods. All of these methods are based on generating a substantial temperature difference through the welded material thickness by applying the heat source on one side of the material and maintaining water cooling on the other side of the material. This temperature difference produces thermal strains and subsequent material plasticity, and a corresponding stress reversal across the thickness of the material. The net result makes the residual stress on the side of the joint exposed to the potentially aggressive reactor water environment significantly less tensile or, more preferably, compressive. These previous methods, including "heat sink welding" and "last pass heat sink welding", have all relied on continuous water convective cooling of the environmentally exposed side of the weld joint in order to effect the required temperature difference and stress reversal. This water cooling requirement is a severe penalty to the fabricator whether the piping is being newly installed or replaced, since the complete piping system must be intact in order to contain the water. The typically used arc welding process which requires water cooling to effect the temperature gradient through the material thickness and a corresponding residual stress reversal has relatively low thermal and time efficiencies and utilizes a wide weld joint design with a low aspect ratio of joint depth to thickness. The reduction of tensile forces residing in the metal lattice structure by internal water cooling during welding serves to mitigate the occurrence of irradiation-assisted SCC, wherein impurities in the stainless steel alloy diffuse to the grain boundaries in response to the impingement of neutrons.

A second major contributor to SCC in stainless steels alloyed with chromium for corrosion resistance is the size and degree of thermal sensitization of the heat affected zone adjacent to the weld. Thermal sensitization refers to the process whereby chromium carbides precipitate in the grain boundaries of the material. The precipitation of chromium carbides ties up the chromium which would otherwise be in solution. Thus, a thin layer along the grain boundary is denuded of chromium, creating a zone which is no longer corrosion resistant and therefore is susceptible to SCC. Such stainless steels corrode at the grain boundaries preferentially.

One consideration in the design of welds for SCC resistance is the minimization of the heat input by the process to the component being joined. This heat input is typically maintained at a level sufficient to provide reliable fusion by the weld filler metal to the side walls of the joint, which have in other welding processes been separated by an amount necessary to move a circular cylindrical electrode in the joint.

Another contributor to SCC in corrosion stabilized austenitic stainless steels is the dissolution of stabilizing carbides near the fusion line of welds, which in turn can lead to grain growth and thermal sensitization when the welding heat input is excessively high. This particular variation of SCC is generally referred to as "knife line attack", as it often occurs in a localized region of the weld heat affected zone.

One type of reduced-groove-width welding process used commercially in power plant piping welds is so-called "narrow groove" welding, an illustration of which is given in FIG. 1B. This technique produces a weld 6' between pipes 2' and 4' which has a heat affected zone which is narrower than and a groove angle which is less than the HAZ and groove angle of the V-groove welding process. The "narrow groove" welding process uses a standard circular cylindrical electrode geometry. These standard electrodes come in various lengths and diameters, typically with a relatively pointed or conical end. However, in "narrow groove" welding, the reduction of the groove width has been limited by the minimum diameter of the electrode required to reliably carry the needed welding current. All previous welds, including "narrow groove" welds, have been made with the circular cylindrical electrode shape, which has become the industry standard. The minimum diameter of a circular cylindrical electrode is in turn limited by the electrical current-carrying and heat-dissipating capability of a given size. No provision has ever been made for the manufacture or installation of a noncylindrical electrode in either a V-groove or "narrow groove" weld application.

SUMMARY OF THE INVENTION

The present invention is a process for providing a significant improvement in the detrimental tensile residual stress condition on the root side of welds, especially on the inside wall of piping welds. The process uses a novel combination of welding parameters, in particular, extremely fast welding torch travel speed, especially on the last one or more passes, commonly referred to as the "cap" passes. In order to obtain the maximum stress improvement benefits, the process of the invention improves upon the low residual stress welding process disclosed in U.S. patent application Ser. No. 08/237,732, which welding technique employs a tungsten electrode blade having a non-circular cross section. That patent application discloses weld torch travel speeds in the range of 2 to 10 inches per minute. The process of the present invention can be performed employing the same flat electrode blade, but higher weld torch travel speeds, i.e., greater than 10 inches/min, particularly during the so-called "cap" passes.

The aforementioned low-residual-stress welding process has been shown to mitigate the normally high (approximately yield strength or greater) residual stress levels to a low value of tension substantially less than the yield strength or, preferably, to a state of compressive stress. This result has been achieved without the use of any supplementary cooling on either surface of the component being joined, as is sometimes utilized in water-cooled processes such as heat sink welding and last pass heat sink welding.

The process in accordance with the present invention is intended primarily for, but is not limited to, the welding or heat treatment of relatively thin materials (e.g., on the order of ⅜ inch thick). The process is considered to be welding if the underlying material of the weld joint is fused during the cap pass or passes. Alternatively, the process is considered to be a heat treatment if the underlying material of the weld joint is heated, but not fused during one or more passes of the welding electrode tip over the far surface (remote from the root) of the weld joint. The present invention encompasses both welding and heat treatment. The term "cap pass" as used herein includes the conventional cap pass or passes in a welding process as well as the heat treatment pass or passes.

The essence of the invention is, using a traveling welding torch, to input heat into the far surface (far from the weld root pass) at a rate such that the far surface is heated and the near surface is cooled (without utilizing external heat sinking, e.g., water cooling) to a degree such that reduced tensile stress or preferably compressive stress is produced in the near surface. Specifically, the process of the invention uses very high welding torch travel speeds during the cap passes, i.e., >10 inches/min, to obtain maximum stress mitigation benefits. This process, whether used as a welding process or as a heat treatment, is hereinafter referred to as "passive heat sink welding" to clearly distinguish it from the existing techniques which require fluid cooling (including gas cooling).

The process of the invention relies on the limited thermal heat sink capability of the pipe wall and nearly completed weld joint itself to generate a significant through-wall temperature gradient, and therefore a sufficient through-wall stress gradient during the welding. This stress gradient results in metal plasticity and permanent strains, and therefore a reduction in the magnitude of the final residual stress or, preferably as conditions allow, a reversal in the direction of the stresses from tensile to compressive. An adequate temperature gradient is achieved using the high torch travel speeds of the present invention, allowing the outer layer of the component wall to be sufficiently heated before excessive conduction through the wall to the inner layer can occur. This effect has been previously demonstrated in thicker wall (high heat sink) material at slower torch travel speed (i.e., 2–10 inches/min) in the low residual stress welding process. In accordance with the invention, this effect can also be obtained for thin wall material (low heat sink) at faster torch travel speeds (i.e., >10 inches/min).

A key difference between these two conditions is that for thin material, the stress reversal is achieved primarily incrementally during the cap pass or passes, whereas for the thick material the stress reversal is achieved progressively as the joint is completed. For welding without supplementary cooling on thin material, the heat input of the cap pass or passes can easily dominate the through-wall temperatures, whereas for thick materials, the heat input of the cap pass or passes has reduced effect on the through-wall temperature distribution. For welding with supplementary cooling, such as in the conventional heat sink welding and last pass heat sink welding processes, the heat of the last pass must be even higher to compensate for the effect of losses due to fluid cooling.

In accordance with a further aspect of the invention, the welding torch is oscillated laterally during the cap pass or passes. The purpose of lateral torch oscillation is to spread the heat on the far surface of the pipe in a manner that produces a reduced tensile stress substantially less than the yield strength or, preferably, a compressive stress over a wider axial length on the near surface, thereby reducing the concentration of bending moment applied across the weld root and mitigating fine circumferential cracking along the fusion line on either side of the weld.

BRIEF DESCRIPTION OF THE DRAWINGS

FIGS. 2A–2C are front, side and bottom views respectively of a first electrode geometry which can be used to weld in accordance with the present invention.

DETAILED DESCRIPTION OF THE PREFERRED EMBODIMENTS

The welding equipment which is preferably used to carry out the process of the present invention comprises a gas tungsten arc welding system with mechanized torch movement. The blade of the tungsten welding electrode has a non-circular cross section. However, it is believed that the use of a flat tungsten electrode is not necessary to practice the present invention.

Figure 1A:
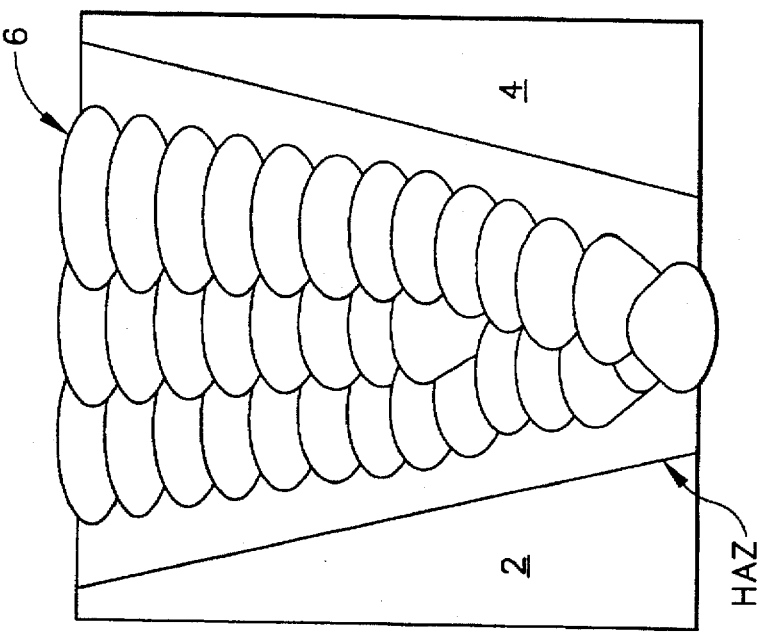
FIG. 1A is a sectional view of a V-groove joint welded in accordance with a conventional welding technique.
Figure 1B:
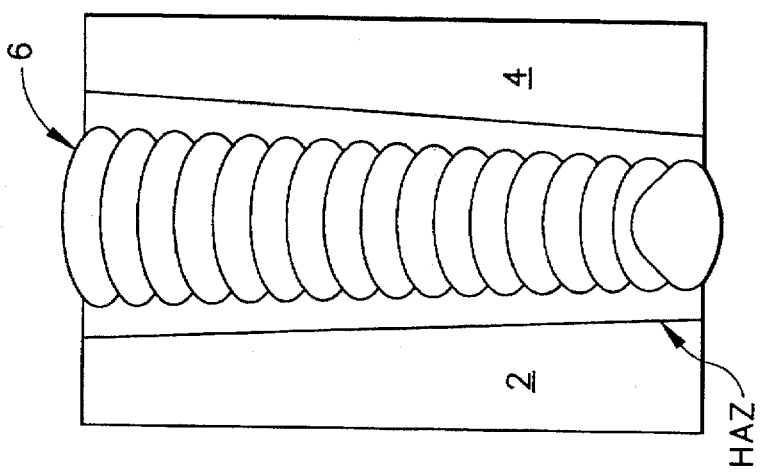
FIG. 1B is a sectional view of a narrow-groove joint welded in accordance with another conventional welding technique.

In accordance with one weld joint geometry (see FIG. 1C) which is useful in practice of the present invention, the groove between pipes 2 and 4 preferably has an acute angle of <6° and is filled with weld material 6 having a reduced width which requires less heat to achieve fusion. The result is a heat affected zone (HAZ) which in narrower than that produced by "narrow-groove" welding, as seen in FIG. 1B.

Preferably, the process of the present invention employs a tungsten electrode having a non-circular blade cross section. In particular, the blade cross section has an elongated dimension which is oriented parallel to the length of the weld joint and a shortened dimension which is oriented perpendicular to the length of the joint, e.g., a cylinder having a generally rectangular cross section. Preferably, the blade is cut or stamped from a flat sheet material, e.g., tungsten alloy sheet stock. The blade can be cut in the shape of a triangle (preferably isosceles) or a strip having parallel straight sides and a pointed tip at one end.

The thin electrode geometry provides an electrode having a dimension (i.e., the width) which is less than the diameter of a circular cylindrical electrode of equal cross-sectional area. This thinner dimension and its orientation enables the electrode to enter thin grooves which a circular cylindrical electrode is too wide to enter. Accordingly, the width of the joint to be welded can be made significantly smaller than is the case were a circular cylindrical electrode to be used. Further, the use of a noncylindrical, thin electrode allows the weld heat input to be significantly reduced for each pass, and therefore the size and sensitization of the heat affected zone is correspondingly reduced.

The elongated-cross section electrode used in the welding process of the invention is basically not limited in how thin it can be, and therefore how thin the weld joint can be, as long as there is clearance to the walls of the joint for forward travel. One embodiment of a flat tungsten alloy electrode which can be utilized to practice the invention has the geometry shown in FIGS. 2A–2C. Electrode 10 comprises a circular cylindrical shank 10a, a non-circular cylindrical blade 10b and a tip 10c. Blade 10b is optionally covered with an insulating coating. All sharp corners are radiused to prevent arcing. The cross section of blade 10b preferably has the shape of a rectangle with rounded corners. Preferably, the ratio of the length to the width of the rectangle is at least 1.5:1.

Figure 4:
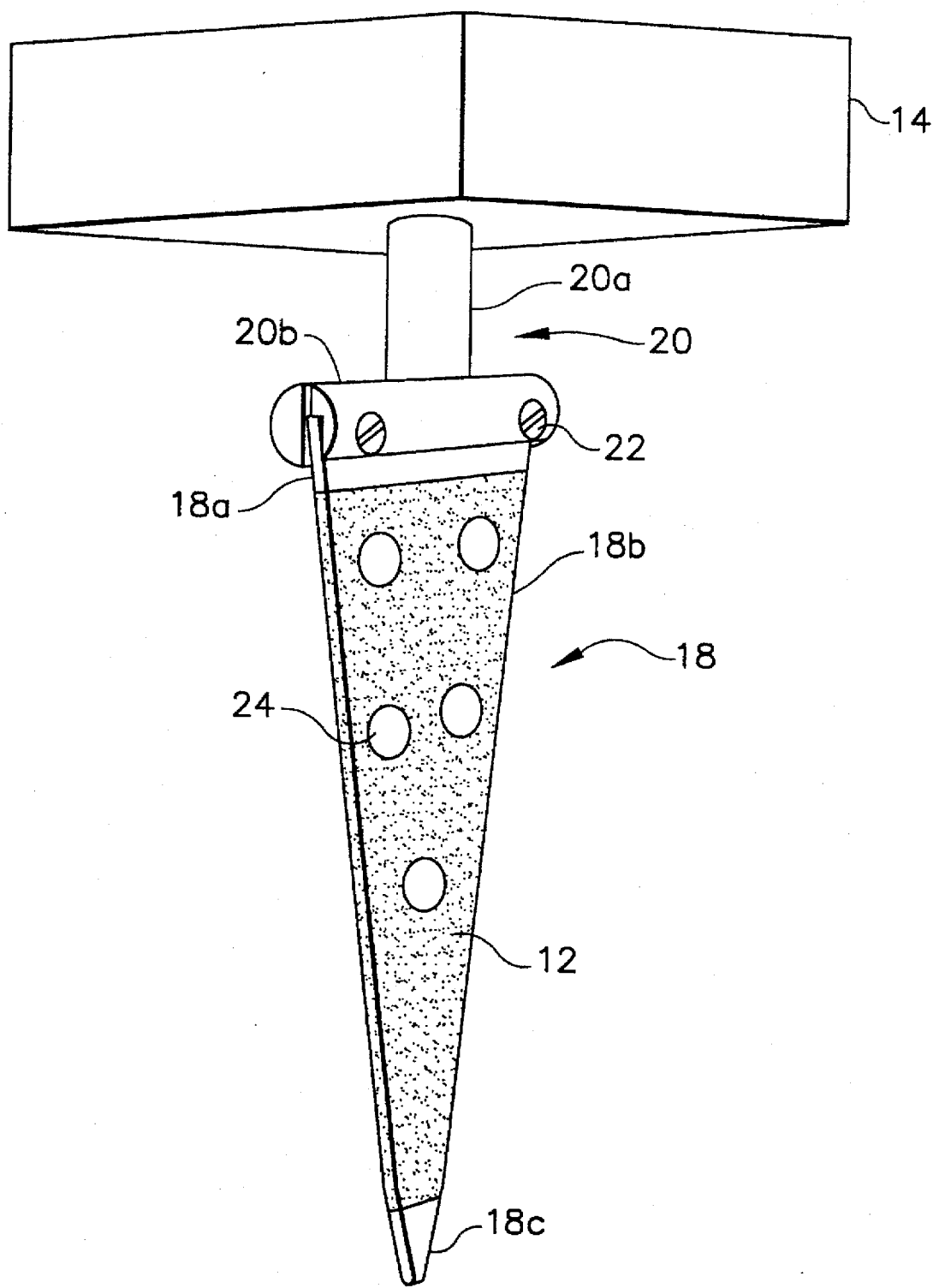
FIG. 4 is a perspective view showing the structure of a second electrode geometry which can be used to weld in accordance with the present invention.

Another embodiment of a flat tungsten alloy electrode which can be utilized to practice the invention has the geometry shown in FIG. 4. The electrode comprises a flat generally triangular blade 18 stamped or cut from tungsten alloy sheet. An exemplary thickness of the tungsten alloy sheet is 30 mils. Optionally the triangular shape of the blade may depart from being strictly isosceles by narrowing the tip 18c at an increased rate.

As depicted in FIG. 4, blade 18 comprises a base 18a, a body 18b and a tip 18c. The base 18a is clamped or otherwise held by an electrode holder 20. Electrode holder 20 is preferably made of a conductive, oxidation-resistant material such as copper alloy (e.g., beryllium copper alloy), optionally electroplated with silver or nickel. The electrode holder preferably takes the form of a T-shaped metal body, comprising a shank 20a and a crosspiece 20b. Shank 20a is connected to a conventional welding torch 14. The crosspiece 20b has a longitudinal slot shaped for receiving the blade base 18a with sufficient play to allow easy insertion and removal. The blade base 18a is held securely in the crosspiece slot by tightening a pair of set screws 22 in a corresponding pair of threaded holes formed in the crosspiece. The blade can be readily removed from the holder after the screws have been loosened. This allows easy replacement of a damaged electrode blade. Also interchangeable electrode blades having different dimensions can be selectively installed depending on the specific application. Alternatively, instead of using screws, the blade could be secured in the holder by brazing to create a monolithic blade assembly, i.e., the blade would not be readily replaceable.

The blade body 18b is preferably covered with an insulating coating, e.g., $Al_2O_3$ or $Y_2O_3$, to prevent arcing to the welding groove sidewalls. Also, all rough edges on the stamped or cut blade are deburred to prevent arcing. In accordance with the preferred embodiment, the flat triangular blade incorporates one or more insulating stand-offs 24. Each insulating stand-off protrudes on both flat sides of the electrode blade beyond the plane of the blade surface. These stand-offs serve to maintain a minimum gap between the side walls of the welding groove and the flat sides of the electrode blade, thus preventing scratching or excessive wear of the ceramic coating during electrode travel in the welding groove. A sufficiently deep scratch on the coated surface of the blade will remove ceramic coating 12, leaving the blade susceptible to arcing along the uncoated locus.

Figure 3A:
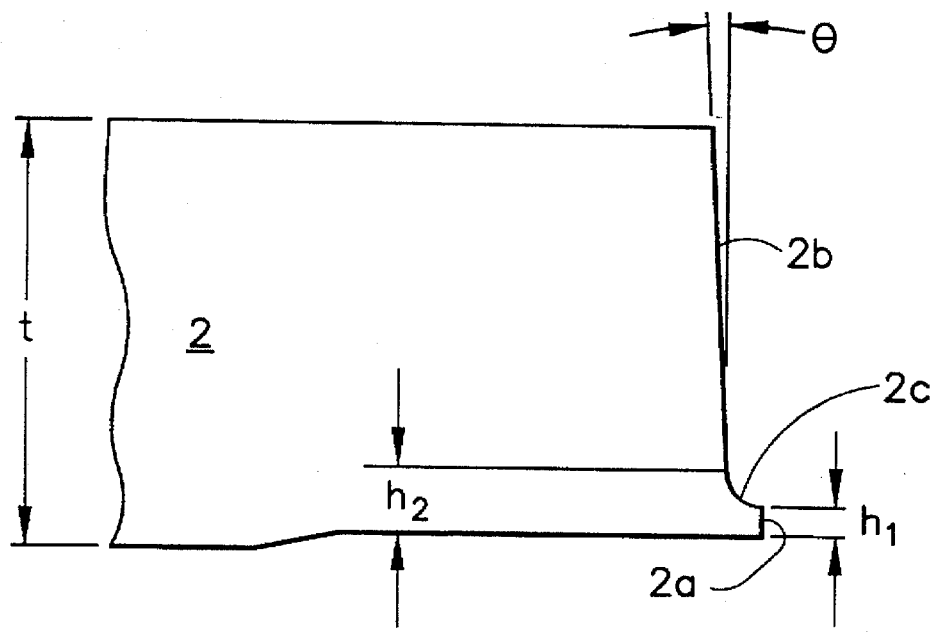
FIGS. 3A and 3B are sectional views of alternative groove geometries of pipe to be joined in accordance with the welding technique of the present invention.

A preferred embodiment of a groove geometry of a pipe 2 to be joined using the welding technique of the present invention is depicted in FIG. 3A. The pipe has a wall thickness t. The end face of the pipe comprises a land 2a, which is an annular radial surface extending outward from the inner circumference of the pipe, and a beveled surface 2b, which is a conical surface extending radially outward at an angle θ relative to the radial plane. In accordance with the present invention, θ is preferably <6°. A radiused extension surface 2c connects the outer periphery of land 2a with the inner periphery of beveled surface 2b. Extension surface 2c has a radius R. The height of land 2a is designated by $h_1$; the height of extension 2c is designated by $h_2$.

The process of the present invention was successfully applied on 4-inch-diameter pipes made of Type 304, 316 and 347 stainless steel in the horizontal position. The 4-inch-diam. pipe had a wall thickness t=0.250 inch. For the purpose of test welding only, the bevel angle θ was selected to be equal to one of the following: 0°, 2°, 3°, 4° and 5°. The land height $h_1$ was varied from 0.025 to 0.050 inch; the extension radius R was varied from 0.032 to 0.062 inch.

Figure 3B:
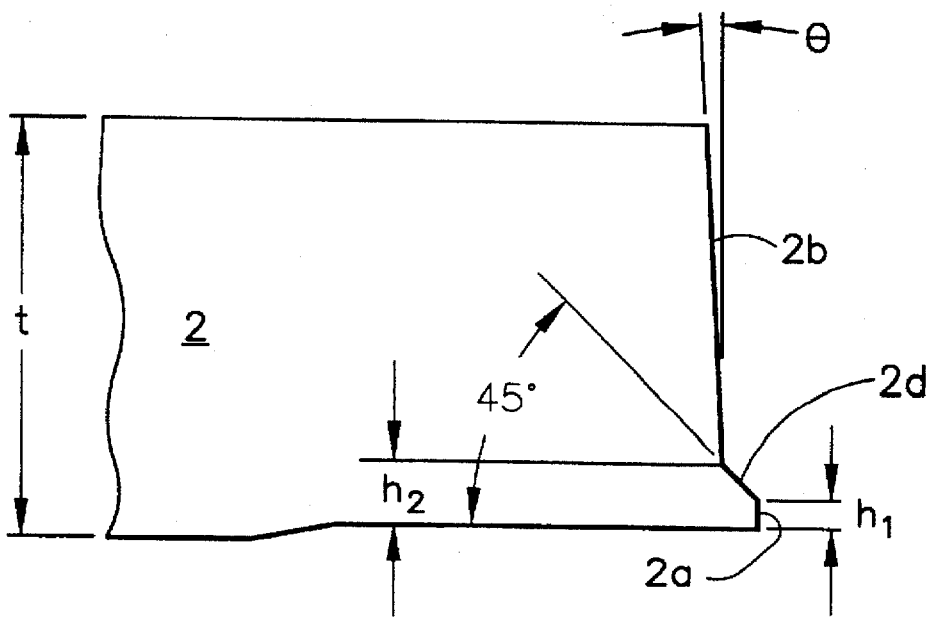

In accordance with an alternative preferred embodiment of the groove geometry, the radiused land extension is replaced by a 45° angle transition 2d, as shown in FIG. 3B.

Figure 5:
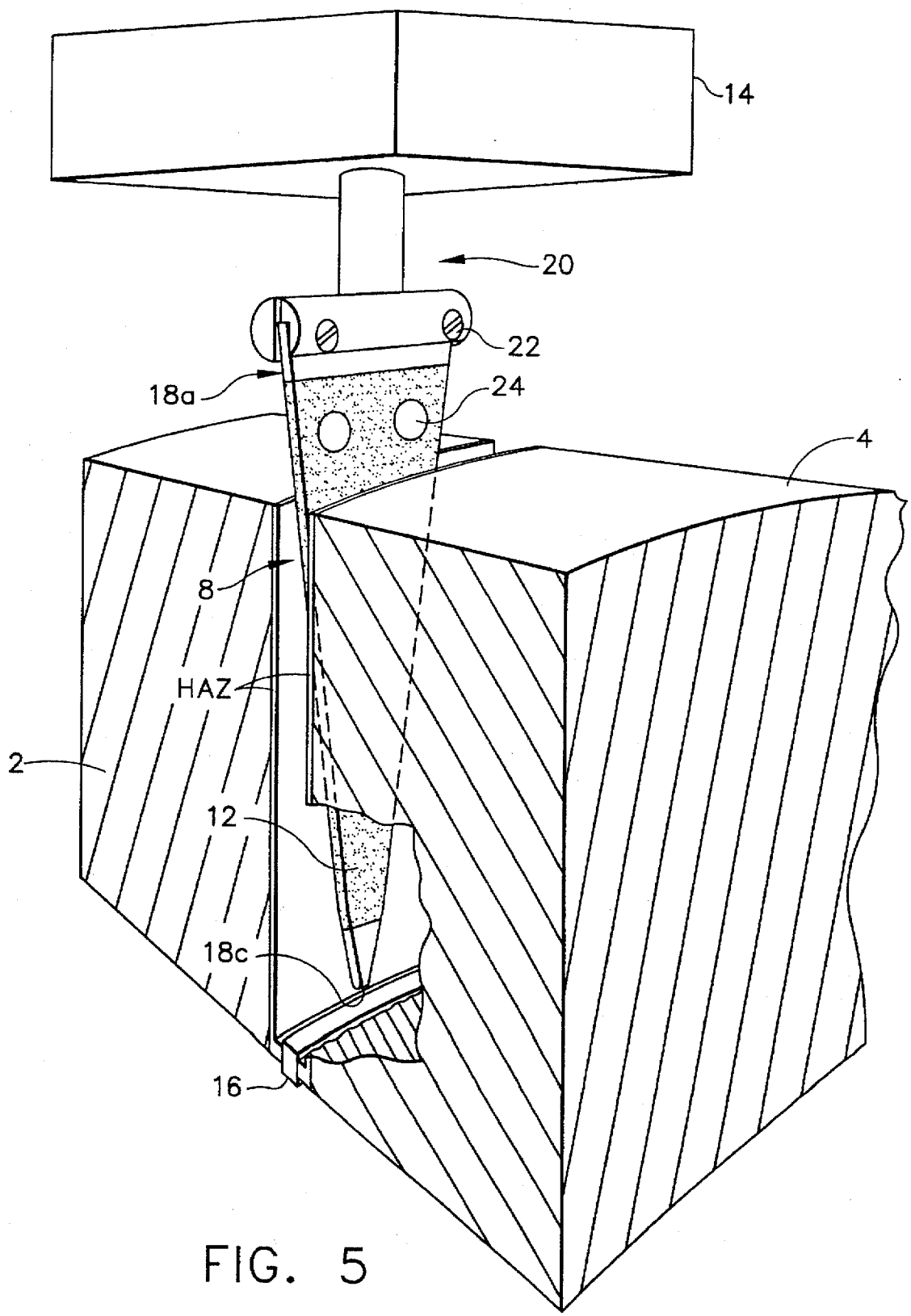
FIG. 5 is a schematic perspective view showing a joint and welding equipment assembly which can be used to weld in accordance with the present invention.

During welding, two pipes 2 and 4 are placed end to end in a horizontal position with a groove 8 therebetween, as shown in FIG. 5. A consumable ring-shaped insert 16 was placed between the lands of opposing pipe ends at the root of groove 8 to compensate for any radial mismatch of the lands. During the first (root) pass, the groove between pipes to be joined must be bridged. The lands and the consumable insert (optional) provide material which is fused together to form the weld root. After the root pass, a hot (second) pass is made, followed by a number of filler passes and one or more cap passes.

The optional insert may, but need not have the same composition as the filler wire. During welding development, inserts made of Type 308L or Type 347 stainless steel were used. Inserts having different cross sections were tried, including the following cross sections which proved to be satisfactory: 0.032×0.055 inch, 0.070×0.120 inch 0.090× 0.125 inch, 0.037×0.120 inch and 0.050×0.125 inch.

The use of a welding gas with a lower electrical resistance in the ionized state in the welding process, such as a blend of argon and hydrogen and/or helium, rather than pure argon, allows the arc length (between the end of the electrode and the bottom of the weld joint) to be reduced, ensuring that the arc does not transfer to the walls of the joint which are closer to the electrode than is the case in other welding processes. The preferred gas blends are hotter (ionize to a higher temperature), and allow the specific heat input rate to be maximized to effect the most benefit from the fast cap pass speed. Typical previous use of these hot gas blends is to improve welding production without defects, and not to improve the residual stress state as described herein. An alternate method specified in the welding process to prevent the arc from transferring to the walls of the joint is to coat the surface of the electrode, except for the tip where the arc is intended to be transferred, with a material such as a ceramic having a greater resistance to ionize the welding gas blend. This provision helps to ensure that the edges (geometric discontinuities) of the electrode along its length are not arc transfer locations which are more favorable than the electrode tip. This method also eliminates the need to insert an electrically insulating gas cup extension into the joint, as is practiced in some other wider joint welding processes.

Figure 1C:
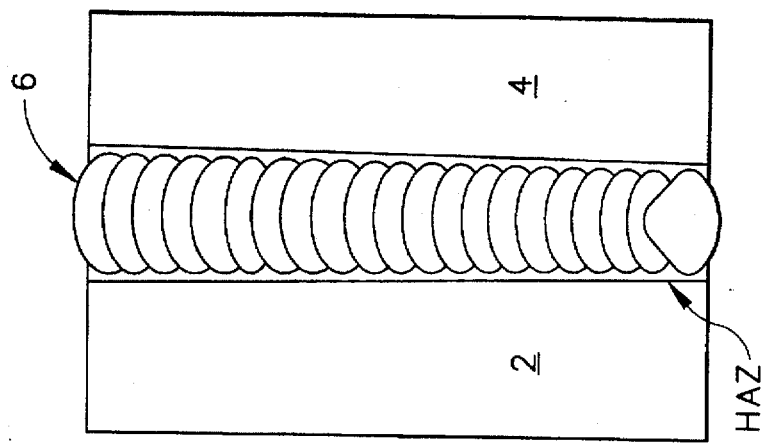
FIG. 1C is a sectional view of a joint welded in accordance with the technique of the present invention.

In accordance with the low residual stress welding process, the weld beads are deposited inside the groove using the thin elongated tungsten alloy electrode to melt the filler wire fed into the groove. The electrode fits inside groove 8 with clearance between the electrode and the sidewalls as shown in FIG. 5. Electrode blade 18 is electrically coupled to a welding torch 14. The flat electrode in conjunction with the small bevel angle and selected welding parameters produce a very thin weld joint, as shown in FIG. 1C.

The very thin weld joint allows the two surfaces being joined to be in closer proximity to each other. As a result of this closeness, both surfaces are simultaneously wetted by a smaller molten weld pool with a significantly lower heat input rate (i.e., improved thermal efficiency) than is otherwise possible. This reduction in heat input per weld pass to the deposited filler material and base materials being welded allows the size and temperature of the heat affected zone (HAZ) adjacent to the fused zone to be significantly reduced, with the benefit of a corresponding reduction in SCC sensitivity of susceptible materials. As a result, the temperature gradient through the thickness of the component being welded is much steeper, since the gradient is controlled by the relatively constant high temperature of the molten metal, and the reduced low temperature of the near surface of the component (also known as the "root" or first pass of the weld). The steeper temperature gradient through the component which is achieved with the very thin weld joint also leads to the benefit of generating a less tensile or, preferably, a compressive residual stress state at the root of the weld. This improved stress state also leads to a reduction in SCC sensitivity of susceptible materials. The combined effects of the reduced thermal sensitization (i.e., carbide precipitation) in the heat affected zones and of the improved stress state at the root of the weld provide a significant increase in SCC resistance of a welded joint exposed to an aggressive environment.

Another related benefit of the reduced heat input, size and temperature of the heat affected zone in accordance with the low residual stress welding process is a reduction in or elimination of grain growth during welding. Significant grain growth in the heat affected zone and the corresponding thermal sensitization in this area leads to the "knife line attack" form of SCC in materials which are otherwise resistant to SCC, such as the stabilized grades of austenitic stainless steel.

The improved residual stress state at the root of a joint made by the low residual stress welding process, relative to the conventional joint welded with a wider groove and a circular cylindrical electrode, is generated by a stress reversal during the welding process. During the welding, the hot, weakened heat affected zone and recently solidified weld metal are plastically compressed due to their thermal expansion relative to the cooler and stronger surrounding material. Upon cooling, this compressed zone contracts against the surrounding material and is put in a state of tensile residual stress. The contraction and corresponding tensile stresses are balanced by the surrounding material, in particular the weld root, going to the desired state of less tensile or to a more desirable compressive stress. The degree of stress improvement depends on the particular welding process parameters used. In the low residual stress welding process, a key factor in making the welding process effective in generating significantly reduced heat affected zone sensitization and root tensile residual stresses without water cooling (external heat sinking) of the component being welded is the very low heat input capability of the process (and corresponding internal heat sinking), made possible by the very thin joint geometry and in turn by the thin, non-circular welding electrode shape.

Another benefit of the reduction in the tensile residual stresses at the root of a joint made with the low residual stress welding process is a decrease in the susceptibility of materials exposed in an irradiation environment to the mechanism of irradiation-assisted stress corrosion cracking (IASCC). This beneficial effect arises due to the retardation of diffusion of the detrimental elements to internal interfaces, which is assisted by the influence of higher tensile residual stresses.

The passive heat sink welding process of the present invention improves upon the above-described low residual stress welding process. The process of the invention has application on all piping and other types of components to be welded. In accordance with that process, the conductive self-cooling effects of the base metal alone, when combined with a very high welding torch travel speed, are capable of significantly improving the residual stress of component weld joints without the need for water or other supplementary cooling of the component during the welding. Due to the uniquely high torch travel speeds (>10 inches/min) used, the inventive process has been made effective even for thin (e.g., 0.25 and 0.375 inch thick) wall material with inherently little self-heat sinking capacity. The high torch travel speeds are in turn made possible due to the use of welding gases having high dissociation/ionization temperatures, including inert gas blends comprising hydrogen and/or helium.

The significant through-wall temperature gradient produced by the high torch travel speeds is achieved due to the combined high heating efficiency, the high heating and cooling rates, the thin joint design utilized and the corresponding small size of each weld pass. The required temperature gradient and thermal stress, and the resulting improved residual stress distribution, are subsequently established through the thickness of the material being welded. The final levels of residual stresses are established as the outer passes, especially the cap passes, of the joint are completed.

The level of welding current is adjusted so that for a limited range of torch travel speed, the desired temperature distribution is established across the wall thickness. The requirement is to have a sufficient portion of the wall thickness hot enough so that its thermal expansion will cause it to be deformed in compression (while hot and weakened) by the balancing forces of the colder part of the wall, and subsequently to go into tension after cooling to ambient temperature. In order to maintain the force balance across the wall after cooling, the part of the wall which was in tension as the torch passed then goes into compression, which is the desired result.

In order for the passive heat sink welding process of the invention to be most effective, it is desirable that the welding parameters used to fill the joint before the very fast cap passes are applied be of a low heat input/low distortion type so that the level of tensile residual stresses at the root of the joint is initially as low as practical. In this respect, use of the low residual stress welding process before the passive heat sink welding process would be very beneficial as the base method for new weld applications. Existing, standard type welds which need residual stress mitigation are expected to benefit from subsequent application of the passive heat sink welding process as well, especially for welds joining thin materials. By applying a heat treatment during the cap passes, i.e., without fusing of the underlying material, the residual stress state can be mitigated to a reduced tensile stress substantially less than the yield strength or, preferably, to a compressive state.

The degree of stress mitigation depends on the thermal and mechanical properties of the material as a function of temperature, as well as on the thickness of the material and the general welding parameters. The unique feature of the passive heat sink welding process in accordance with the invention is that the tensile residual stresses are significantly reduced or eliminated by intentional control of the final welding specific heat input rate (per unit area of the weld joint outside surface) to a relatively high value, applied for a relatively short time, and in turn generating the typical magnitude of the through-wall temperature gradient (from above the melting temperature of the metal at the final surface to temperatures near ambient at the initial surface) normally achieved only with supplemental cooling, which is generally flowing water.

The specific heat input rate is maximized as desired by using a hot welding gas, and especially by moving the torch at the uniquely high forward travel speeds during the final cap pass or passes. Secondary adjustments to the heat input rate are controlled with the welding current and/or voltage. The high torch travel speed in accordance with the teaching of the invention (namely, >10 inches/min) is faster than the speeds conventionally used for electric arc welding in general and gas tungsten arc welding in particular by at least a factor of three, and has previously been considered unacceptable for sound welding practice. The invention utilizes the effect of extremely high torch travel speeds to significantly redistribute and optimize the residual stresses. Nevertheless, testing has demonstrated that the passive heat sink welding process is both effective for stress mitigation and suitable for various types of mechanized applications without any sacrifice in weld structural integrity.

Some of the welding process parameters which control the thermal efficiency of the process include the arc gas composition, the torch travel speed, and the arc current and current pulsing values. These and other parameters have been selected in order to further the minimization of the heat affected zone and the root tensile residual stress. Measurements of the pipe diameter and axial length revealed that shrinkage was reduced, resulting in less tensile stress, if not compressive stress at the near surface of the weld joint.

Different inert gas mixtures were tested as the shield gas. The mixture of argon with either hydrogen or helium increases the temperature of the arc, causing the weld puddle to wet the substrate more quickly. Because of the high energy density, the skin of the substrate is heated quickly, leaving less time for the conduction of heat below the skin. This produces a thinner heat affected zone than is conventionally known. The addition of hydrogen or helium also shortens the arc, so that less clearance to the side walls is needed.

Different torch travel speeds were tried during test welding. The root pass was made at speeds of 5.0–10.0 inches/min. The torch travel speed for the hot pass varied between 5.5 and 16.5 inches/min. The cap passes were made at speeds of 10 inches/min or greater. Satisfactory welds, i.e., welds with reduced tensile stress substantially less than the yield strength or with compressive stress at the near surface, were obtained using torch travel speeds of 16.5, 20 and 25 inches/min for the cap pass or passes.

Figure 6A:
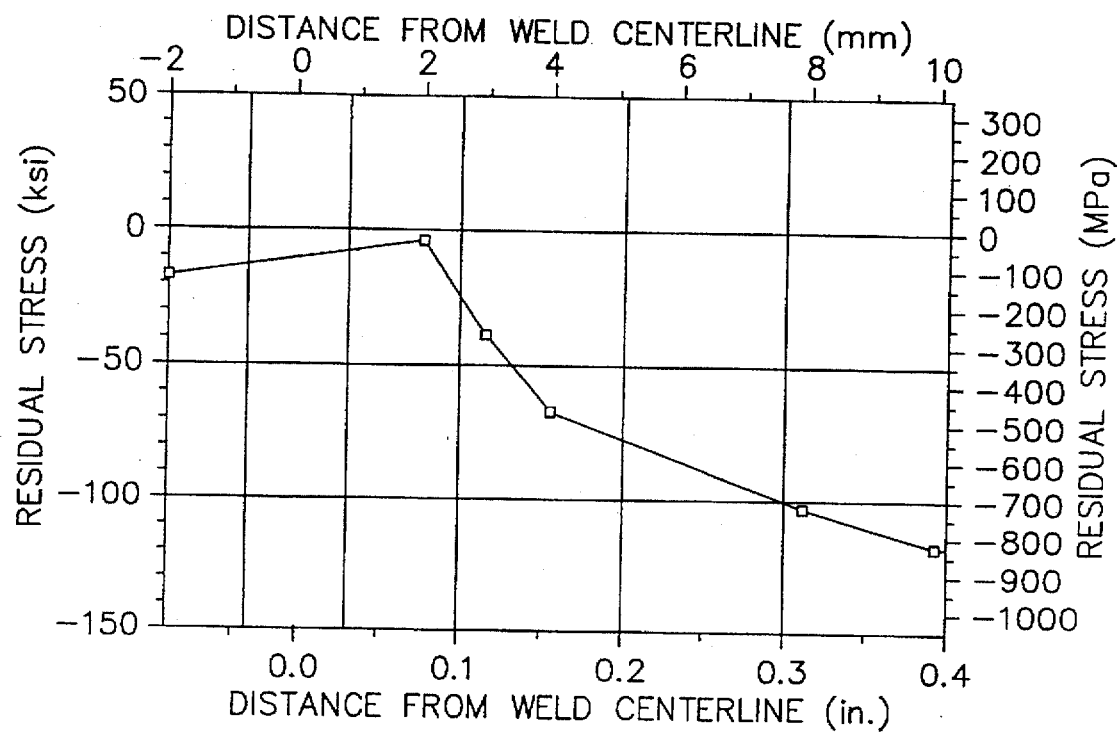
FIGS. 6A and 6B are graphs showing the axial and hoop residual stresses respectively as measured on the inside diameter of Type 304 stainless steel 4-inch-diameter pipe butt girth welded in accordance with the present invention.
Figure 6B:
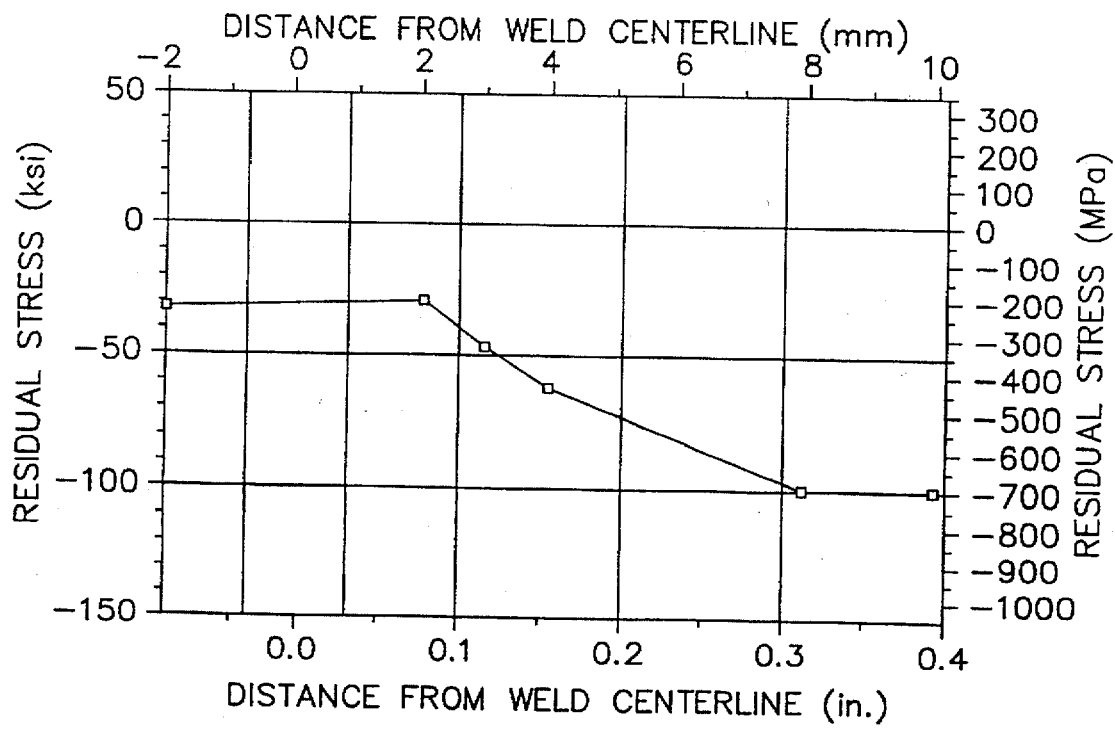
Figure 7A:
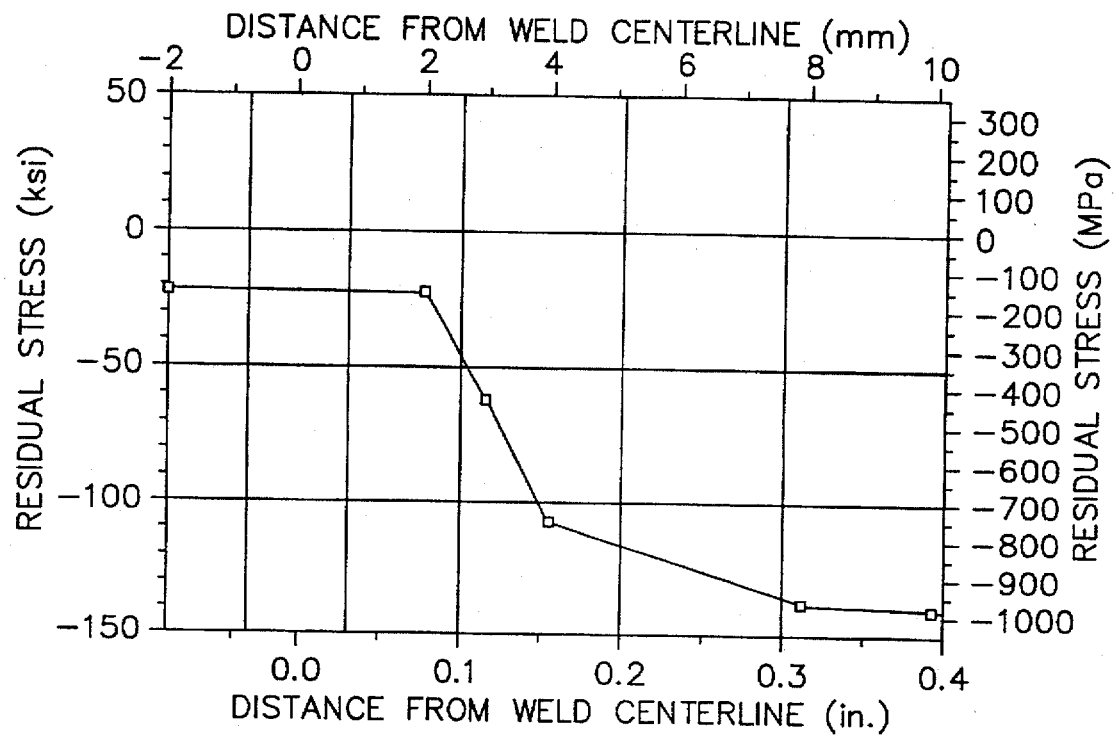
FIGS. 7A and 7B are graphs showing the axial and hoop residual stresses respectively as measured on the inside diameter of Type 347 stainless steel 4-inch-diameter pipe butt girth welded in accordance with the present invention.
Figure 7B:
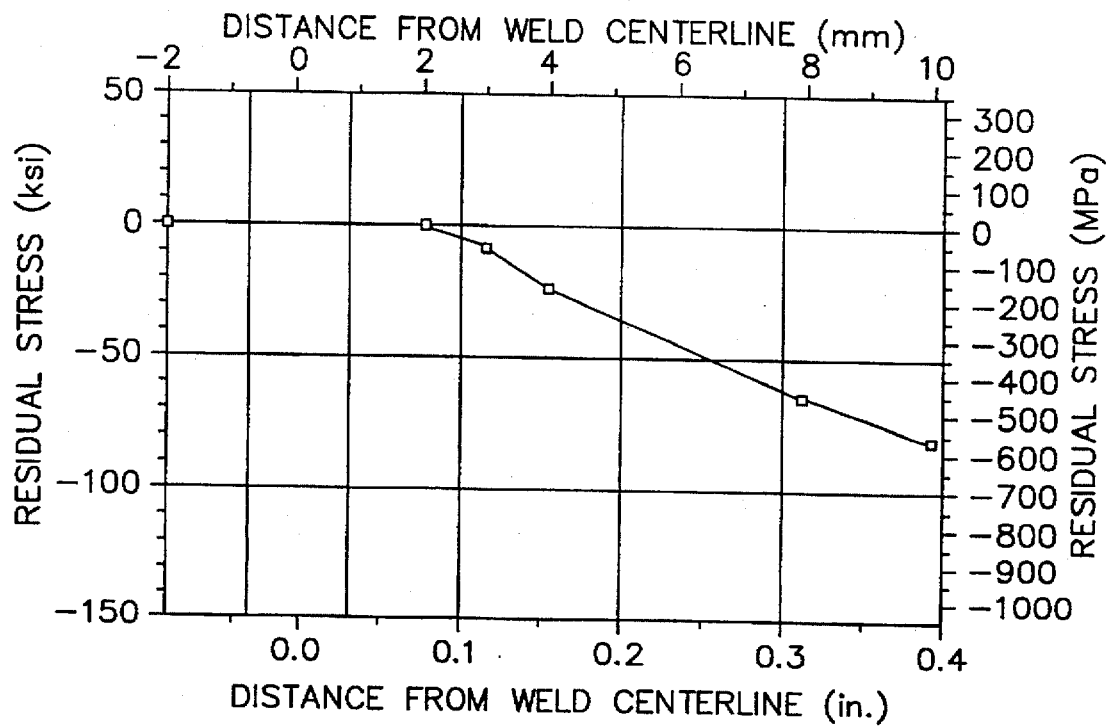

X-ray diffraction measurements on the inside surface of welds made in accordance with the present invention have shown that a substantial stress improvement has been achieved, with all of the region of interest near and in the weld root being in a state of compressive stress. This can be seen in FIGS. 6A and 6B and in FIGS. 7A and 7B, which respectively show the axial and hoop residual stresses as measured on the inside diameter of Type 347 and Type 304 stainless steel 4-inch-diameter pipe butt girth welded in accordance with the present invention. The X-ray diffraction results were confirmed by tests performed in accordance with ASTM G36-73, Standard Recommended Practice for Performing Stress Corrosion Cracking Tests in a Boiling Magnesium Chloride Solution.

In accordance with a further aspect of the invention, the welding torch is oscillated laterally during the cap pass or passes. The purpose of lateral torch oscillation is to spread the heat on the far surface of the pipe in a manner that produces a compressive stress state over a wider axial length on the near surface, thereby reducing the concentration of bending moment applied across the weld root and mitigating fine circumferential cracking along the fusion line on either side of the weld. The lateral oscillation can be carried out mechanically by moving the head back and forth by motor drive or electromagnetically by applying an oscillating electromagnetic field which causes the arc to deflect from side to side.

In accordance with a further alternative, two or more beads can be laid side by side in separate cap passes. The provision of multiple cap passes laterally distributes heat to both sides of the weld centerline, again for the purpose of reducing the concentration of bending moment applied across the weld root.

The foregoing process has been disclosed for the purpose of illustration. Variations and modifications of the disclosed process will be apparent to practitioners skilled in the art of welding. For example, the current and voltage supplied to the electrode can be adjusted as necessary in dependence on the torch travel speed and the joint geometry to achieve the desired compressive stress state. All such variations and modifications which do not depart from the concept of the present invention are intended to be encompassed by the claims set forth hereinafter.

I claim:

1. A method for heat treating first and second metal components joined in a depthwise direction by a weld joint formed, at least in part, by a root pass at a near surface and a plurality of passes built successively on top of said root pass in a direction from said near surface to a far surface, comprising the step of heating said far surface of said weld joint during a pass by discharging an arc of electric current from a tip of an electrode traveling along said far surface at a torch travel speed such that a temperature distribution is created across the material between said near and far surfaces, whereby the stress state at said near surface undergoes a reversal from tension to compression substantially without heat sinking external to said near surface.

2. The method as defined in claim 1, wherein said electrode tip travels at a speed greater than 10 inches per minute.

3. The method as defined in claim 1, wherein said far surface is heated without fusion of the material making up said far surface.

4. The method as defined in claim 1, wherein said first and second metal components are pipes, and said electrode tip travels at a speed greater than 10 inches per minute.

5. The method as defined in claim 1, further comprising the step of adding filler material during said heating step.

6. The method as defined in claim 1, wherein each of said first and second metal components has a bevel angle which is less than 6°.

7. The method as defined in claim 1, wherein said heating step is performed in an inert gas atmosphere comprising hydrogen and/or helium.

8. The method as defined in claim 1, wherein said arc oscillates laterally during travel of said electrode tip.

9. The method as defined in claim 1, wherein said heating step comprises first and second parallel passes of said electrode at first and second axial locations respectively.

10. A method for heat treating first and second metal components joined in a depthwise direction by a weld joint formed, at least in part, by a root pass at a near surface and a plurality of passes built successively on top of said root pass in a direction from said near surface to a far surface, comprising the step of heating said far surface of said weld joint during a cap pass by discharging an arc of electric current from a tip of an electrode traveling along said far surface at a torch travel speed such that a temperature distribution is created across the material between said near and far surfaces substantially without heat sinking external to said near surface and said electrode travels at a speed greater than 10 inches per minute during said cap pass.

11. The method as defined in claim 10, wherein said far surface is heated without fusion of the material making up said far surface.

12. The method as defined in claim 10, wherein said first and second metal components are pipes.

13. The method as defined in claim 10, further comprising the step of adding filler material during said heating step.

14. The method as defined in claim 10, wherein said heating step is performed in an inert gas atmosphere comprising hydrogen and/or helium.

15. The method as defined in claim 10, wherein said arc oscillates laterally during travel of said electrode tip.

16. The method as defined in claim 10, wherein said heating step comprises first and second parallel passes of said electrode at first and second axial locations respectively.

17. A weld joint for joining first and second metal components in a depthwise direction, comprising a root pass at a near surface and a plurality of passes built successively on top of said root pass in a direction from said near surface to a far surface, said weld joint having a residual stress state produced by a process comprising the step of heating said far surface of said weld joint during a pass by discharging an arc of electric current from a tip of an electrode traveling along said far surface at a torch travel speed such that a temperature distribution is created across the material between said near and far surfaces, whereby the stress state at said near surface undergoes a transition from relatively high tension to relatively low tension or compression substantially without heat sinking external to said near surface.

18. The weld joint as defined in claim 17, wherein said electrode tip travels at a speed greater than 10 inches per minute.

19. The weld joint as defined in claim 17, wherein said far surface is heated without fusion of the material making up said far surface.

20. The weld joint as defined in claim 17, wherein said first and second metal components are pipes, and said electrode tip travels at a speed greater than 10 inches per minute.

21. The weld joint as defined in claim 17, further comprising the step of adding filler material during said heating step.

22. The weld joint as defined in claim 17, wherein each of said first and second metal components has a bevel angle which is less than 6°.

23. The weld joint as defined in claim 17, wherein said arc oscillates laterally during travel of said electrode tip.

24. The weld joint as defined in claim 17, wherein said heating step comprises first and second parallel passes of said electrode at first and second axial locations respectively.

25. A method for heat treating first and second metal components joined in a depthwise direction by a weld joint formed, at least in part, by a root pass at a near surface and a plurality of passes built successively on top of said root pass in a direction from said near surface to a far surface, wherein prior to said heat treating said weld joint has residual tensile stresses at said near surface which are substantially equal to or greater than a predetermined tensile stress, comprising the step of heating said far surface of said weld joint during a cap pass by discharging an arc of electric current from a tip of an electrode traveling along said far surface at a torch travel speed such that a temperature distribution is created across the material between said near and far surfaces, whereby a stress less than said predetermined tensile stress is formed at said near surface substantially without heat sinking external to said near surface.

26. The method as defined in claim 25, wherein said predetermined tensile stress is substantially equal to the yield strength of the material of said weld joint.

27. The method as defined in claim 25, wherein said electrode tip travels at a speed greater than 10 inches per minute.

28. The method as defined in claim 25, wherein said far surface is heated without fusion of the material making up said far surface.

* * * * *